(12) United States Patent
Viitala et al.

(10) Patent No.: US 12,222,209 B2
(45) Date of Patent: Feb. 11, 2025

(54) METHOD, APPARATUS, AND SYSTEM FOR SHIPMENT TRACKING

(71) Applicant: HERE Global B.V., Eindhoven (NL)

(72) Inventors: Mika Ahti Petteri Viitala, Tampere (FI); Matias Mikkola, Tampere (FI); Lauri Hytönen, Tampere (FI)

(73) Assignee: HERE Global B.V., Eindhoven (NL)

( * ) Notice: Subject to any disclaimer, the term of this patent is extended or adjusted under 35 U.S.C. 154(b) by 473 days.

(21) Appl. No.: 17/187,222

(22) Filed: Feb. 26, 2021

(65) Prior Publication Data
US 2022/0276061 A1    Sep. 1, 2022

(51) Int. Cl.
*G01C 21/34* (2006.01)
*G06Q 10/08* (2024.01)
(Continued)

(52) U.S. Cl.
CPC ........ *G01C 21/3407* (2013.01); *H04W 4/021* (2013.01); *H04W 4/024* (2018.02); *H04W 4/029* (2018.02); *G06Q 10/08* (2013.01); *G06Q 10/10* (2013.01); *G16Y 10/40* (2020.01); *G16Y 20/10* (2020.01)

(58) Field of Classification Search
CPC .............. G01C 21/3407; H04W 4/021; H04W 4/024; H04W 4/029; Y02D 30/70; G06Q 10/08; G06Q 10/083; G06Q 10/0833; G06Q 10/00; G06Q 10/10; G06Q 50/28; G01S 19/14; G01S 19/42; G01D 21/02; G16Y 10/40; G16Y 20/10
See application file for complete search history.

(56) References Cited

U.S. PATENT DOCUMENTS

| 8,766,791 B2 * | 7/2014 | Koen ...................... G01S 19/16 340/988 |
| 8,886,215 B1 * | 11/2014 | Crossno ............. G06Q 10/0833 455/456.6 |

(Continued)

FOREIGN PATENT DOCUMENTS

| EP | 3 772 664 A1 | 2/2021 |
| WO | 2019034307 A1 | 2/2019 |

OTHER PUBLICATIONS

Office Action for related European Patent Application No. 22158874. 2-1218, dated May 30, 2022, 10 pages.

*Primary Examiner* — Jelani A Smith
*Assistant Examiner* — Alyssa Rorie
(74) *Attorney, Agent, or Firm* — DITTHAVONG, STEINER & MLOTKOWSKI

(57) ABSTRACT

Inter-alia, a method is disclosed comprising: receiving a tracking device report at least indicative of a position of a tracking device; determining a segment along a transportation route comprising a plurality of segments to which the position of the tracking device report corresponds to, based, at least in part, on the tracking device report; and providing a configuration associated with the determined segment to the tracking device, wherein the configuration is indicative of segment specific settings for the tracking device, wherein the configuration is provided if a segment change along the transportation route has occurred, or if an updated configuration for a current segment not provided to the tracking device is available. It is further disclosed an according apparatus, and a computer program.

16 Claims, 3 Drawing Sheets

(51) Int. Cl.
*H04W 4/021* (2018.01)
*H04W 4/024* (2018.01)
*H04W 4/029* (2018.01)
*G06Q 10/10* (2023.01)
*G16Y 10/40* (2020.01)
*G16Y 20/10* (2020.01)

(56) References Cited

U.S. PATENT DOCUMENTS

| | | | |
|---|---|---|---|
| 9,558,468 B2 * | 1/2017 | Donlan | G06Q 10/0833 |
| 9,704,084 B2 | 7/2017 | Nordlund et al. | |
| 9,916,559 B2 | 3/2018 | Barcala et al. | |
| 10,482,419 B2 | 11/2019 | Komoni | |
| 11,222,486 B1 * | 1/2022 | Subramanian | G06Q 10/0833 |
| 2009/0061897 A1 | 3/2009 | Hamilton et al. | |
| 2009/0146832 A1 * | 6/2009 | Ebert | H04L 67/12 |
| | | | 340/8.1 |
| 2012/0161958 A1 * | 6/2012 | Turon | G01S 19/34 |
| | | | 340/539.3 |
| 2015/0166163 A1 * | 6/2015 | Longson | B63J 99/00 |
| | | | 340/984 |
| 2017/0243159 A1 * | 8/2017 | Hurst | G06Q 10/0833 |
| 2018/0249291 A1 * | 8/2018 | Shamim | H04W 4/023 |
| 2021/0120371 A1 * | 4/2021 | Klinkner | G08B 21/0272 |
| 2022/0095079 A1 * | 3/2022 | Volkerink | H04W 4/029 |

* cited by examiner

METHOD, APPARATUS, AND SYSTEM FOR SHIPMENT TRACKING

FIELD

The following disclosure relates to the field of positioning, or more particularly relates to systems, apparatuses, and methods for adaptive shipment tracking and/or multi-modal shipment tracking.

BACKGROUND

Multi-modal shipment tracking introduces several challenges to tracking devices (also referred to as tracker) and their efficient usage. Transportation of shipments can be divided into multiple segments e.g. based on different modes of transport, which may introduce contradicting requirements for the tracking device functionality depending on the segment.

For instance, segments may use different geofences for modelling origin and destination locations. Offline geofencing enables "just-in-time" ingestions when tracked shipment arrives into a waypoint/destination, which may decrease latencies significantly while maintaining high power efficiency. As such tracking devices are commonly Internet-of-Things (IoT) devices with restricted hardware resources, the tracking devices may have constraints for offline geofencing e.g. on the number of concurrently supported offline geofences. Thus, it may not be possible to maintain all required offline geofences for the entire shipment along its route in the tracker at the same time.

It is common that tracking devices are pre-configured for the duration of the entire journey. There are existing solutions that incorporate minor adaptivity depending on simplistic state transitions, which implements e.g. distinct modes for trackers, such as:

Tracker shipping to customer from service provider;
Tracker activated by customer and actively tracking a shipment; and/or
Tracker deactivated by customer and on its way back to service provider.

Such modes are mainly related to (e.g. return) logistics of the respective tracker as that is the core concern of the service provider. The respective mode affects at least on following attributes:

Data ingestion rate;
which entity can see the produced data, e.g. customer or service provider; and
which sensor and location-based rules are applied in the backend service.

Further, in some circumstances it appears not necessary to provide the whole information a tracking device is enabled to provide, since e.g. the tracking device may be located inside of a warehouse waiting to continue its transportation, to name but one non-limiting example. Also, providing the whole information e.g. gathered with the sensors of the tracking device substantially increases battery consumption.

SUMMARY OF SOME EXEMPLARY EMBODIMENTS

However, it is a drawback that due to hardware restrictions on a tracking device e.g. memory capabilities, and/or battery capacity, (e.g. near) real-time tracking is not possible. Further, such tracking devices are pre-configured, and in particular automatic adaption of the configuration is not possible.

It is thus, inter alia, an object to provide better visibility on shipments and their status, and provide means to enable (e.g. near) real-time services on various events and/or exceptions such as variations on route, schedule, mode of transportation, to name but a few non-limiting examples.

According to a first exemplary aspect, a method is disclosed, the method comprising:

receiving a tracking device report at least indicative of a position of a tracking device;
determining a segment along a transportation route comprising a plurality of segments to which the position of the tracking device report corresponds to, based, at least in part, on the tracking device report; and
providing a configuration associated with the determined segment to the tracking device, wherein the configuration is indicative of segment specific settings for the tracking device, wherein the configuration is provided if a segment change along the transportation route has occurred, or if an updated configuration for a current segment not provided to the tracking device is available.

This method may for instance be performed and/or controlled by an apparatus, for instance a server. Alternatively, this method may be performed and/or controlled by more than one apparatus, for instance a server cloud comprising at least two servers. For instance, the method may be performed and/or controlled by using at least one processor of the apparatus.

According to a further exemplary aspect, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a further exemplary aspect, a system is disclosed, comprising: an apparatus according to the first aspect as disclosed above, and one or more electronic devices, e.g. tracking devices, wherein the one or more electronic devices are configured to provide tracking device reports based, at least in part, on one or more configurations received from the apparatus according to the first aspect as disclosed above.

In the following, exemplary features and exemplary embodiments of all aspects will be described in further detail.

The tracking device may be a low-capability device, an IoT device, or a physical tracking device (e.g. a tracker). Steps or actions performed by the tracking device may be performed and/or controlled by using at least one processor of such an apparatus, and/or by using at least one component or module of such an apparatus.

The solution according to all exemplary aspects may allow a (e.g. near) real-time tracking of one or more transportable assets. A respective tracking device report may be in the form of data. Such data may represent a location of the tracking device, e.g. in the form of a location information indicative of a position/location of the tracking device. Such a position/location as represented by location information may be defined in coordinates (e.g. latitude-, longitude coordinates), and/or as information about measured radio signals (e.g. a combination of one or more identifiers of access points and/or radio nodes whose signals are observable and/or the respective received signal strengths of the signals). The tracking device may be a physical device that is at least temporarily attachable (e.g. by gluing, mounting, or the like fixing method) to a transportable asset. The apparatus performing and/or controlling the method according to the first exemplary aspect may use such information (e.g. a combination of one or more identifiers of access points and/or radio nodes whose signals are observable and the respective received signal strengths of the signals) to estimate the respective location/position of the tracking device.

A transportable asset, as used herein, may be a unit of sale of a good or item. Such goods or items may be delivered, e.g. to a store from one or more warehouses and/or directly from a vendor or a manufacturer to a store, or to a facility that utilize the goods or items for further purposes, to name but a few non-limiting examples. A plurality of such transportable assets may be grouped or packaged together, e.g. in cases, on pallets, packages, boxes, containers, or the like. Such a transportable asset may for instance be a good/items or a plurality of goods/items to be handled together, e.g. a plurality of goods or items packaged on a single palette.

As used herein, the term "transportation vehicle" is used to denote any modality of shipping or anything capable of carrying goods or items. Such a transportation vehicle may be, but not being limited to, cargo ships, vans, trailers, cars, trucks, trains, cargo airplanes, containers, pallets, cubes, etc., to name but some non-limiting examples. Such a transportation vehicle may be used, at least in part on a segment of a transportation route (also referred to as transportation chain), to transport the transportable asset together with the respective tracking device.

One or more tracking device reports (e.g. multiple, thus, at least two) can be obtained (e.g. received) from the same (e.g. physical) tracking device, wherein a respective tracking device report may comprise multiple position estimates enabling to trace a path the respective tracking device associated with the tracking device report may have travelled along the transportation route, and/or within a segment of the transportation route. Additionally or alternatively, one or more tracking device reports (e.g. multiple, thus, at least two) can be obtained (e.g. received) from a plurality (e.g. at least two) of (e.g. physical) tracking devices. In this case, it may be beneficial if the respective tracking device reports are further indicative of a tracking device identifier enabling identification the respective tracking device from which the respective tracking device report stems.

A respective tracking device may be attached to such a transportable asset and/or transportation package (e.g. a pallet, or a container), or to a transportation vehicle (e.g. a truck, train, freighter, airplane or the like).

A respective transportable asset may for instance be transported along a transportation route or transportation chain.

The tracking device may for instance generate tracking device reports according to a configuration that the tracking device may receive from the apparatus according to the first exemplary aspect. The tracking device may receive updated or new configuration from the apparatus according to the first exemplary aspect. The tracking device may determine a position estimate based, at least in part on the received configuration, wherein such a position estimate is indicative of a position of the tracking device. The position estimate may be part of the tracking device report. The determining of a respective position may further be based on Global Navigation Satellite System (GNSS)- and/or non-GNSS-based positioning technologies. The tracking device may be configured to provide such generated tracking device reports, e.g. to the apparatus according to the first exemplary aspect. The position estimate may for instance be provided (e.g. sent) to the apparatus (e.g. a server or server cloud) performing and/or controlling the method of the first exemplary aspect directly, e.g. over a communication network, e.g. as specified in the received configuration, or via an entity that is different from the apparatus according to the first exemplary aspect and that relays (e.g. forwards) the tracking device report to the apparatus according to the first exemplary aspect.

A respective (e.g. coarse) position (e.g. estimate) may be determined by the tracking device based on GNSS-based and/or non-GNSS-based positioning. Examples for GNSS-based positioning are GPS (Global Positing System), GALILEO, GLONASS (Globalnaja nawigazionnaja sputnikowaja sistema), and examples for non-GNSS-based positioning are fingerprinting based on radio signals sent by e.g. BT (Bluetooth) and/or BLE (Bluetooth Low Energy) beacons and/or WLAN (Wireless Local Area Network) access points, cellular communication network signals such as 2G/3G/4G/5G signals, to name but a few non-limiting examples.

The tracking device may for instance be portable (e.g. weigh less than 3, 2, 1, 0.5, 0.2 kg, 0.1 kg or less). The tracking device may for instance comprise or be connectable to means for outputting information or sound, e.g. in the form of spoken commands or information. The tracking device may for instance comprise or be connectable to one or more sensors for determining the devices position, such as for instance a GNSS (Global Navigation Satellite System)

receiver, in the form of a GPS receiver. The tracking device may for instance comprise or be connectable to one or more sensors, e.g. in the form of an accelerometer and/or a gyroscope for gathering (e.g. measuring) further information to be generated into the tracking device report. The tracking device may for instance comprise or be connectable to a receiver and/or a transmitter (e.g. a transceiver) for receiving and/or sending information. For instance, the tracking device may comprise one or more radio receivers (e.g. radio transceivers) to gather measurements based on GNSS- or non-GNSS-based positioning signals, which may for instance enable a (e.g. coarse) position estimate indicative of the tracking devices position to be determined or triggered to be determined, and/or to be comprised by one or more position estimates that are determined. The tracking device may for instance be suitable for outdoor and/or indoor navigation respectively positioning. The tracking device may further comprise one or more environmental sensors, such as luminosity sensors, temperature sensors, humidity sensors, barometric sensors, sound pressure level sensors (e.g. microphones), cameras, or a combination thereof, to name but a few non-limiting examples. The tracking device may for instance comprise various other components like a user interface for receiving user input. For instance, by a respective camera, information as measurements of the tracking device's surrounding environment (e.g. gathered or measured or recorded information by the camera) may be derivable or determinable. For instance, this may allow to monitor one or more conditions of the cargo, to name but one non-limiting example.

The tracking device may for instance have GNSS-capability. A user tracking the transportable asset via the tracking device can further benefit in case the tracking device has in addition or in alternative to a GNSS-capability a capability to use non-GNSS-based positioning system(s)/technology, such as cellular/non-cellular positioning technologies, e.g. in terms of time-to-first-fix and power consumption. Also, not all applications require highly accurate GNSS-based position (e.g. in situation(s) or location(s) where an accurate position estimate cannot be determined, it might be sufficient to use cell-based position estimate enabling at least an area (e.g. a warehouse) in which the transportable asset is located to be determined). Also, cellular/non-cellular positioning technologies work indoors and in urban canyons, which are generally challenging environments for GNSS-based technologies.

Further, the tracking device may be configured to determine its position in a terminal-based mode (offline mode), in which the tracking device may have a local copy of a radio map (or most likely, a subset or partial radio map of a global radio map). Such a partial radio map may for instance cover an area of the segment in which the tracking device is located. Such a partial radio map may be part of the configuration that is provided to the tracking device.

Such a radio map may be configured to enable the tracking device to estimate its position at least partially based on this radio map when the tracking device is located in the area covered by the radio map. For example, the radio map may be represented by radio map information which may be provided (e.g. transmitted) by the apparatus according to the first exemplary aspect to the tracking device and/or which may be hold available by the tracking device (e.g. stored in memory means of the tracking device). For example, the radio map contains or represents a respective radio model for a plurality of radio nodes transmitting (e.g. broadcasting) radio signals that are observable within the area covered by the radio map. If the radio map covers an area (e.g. geographic area) or a venue (e.g. building), the radio map may further contain or represent, for a floor of the venue, or for a height within the area, a respective radio model for a plurality of radio nodes transmitting (e.g. broadcasting) radio signals that are observable on the respective floor of the venue.

Such radio signals may be terrestrial radio signals. Examples of such a terrestrial radio signal are a Bluetooth (BT) signal, a BT Low Energy (BLE) signal, a cellular network signal or a Wireless Local Area Network (WLAN) signal. The Bluetooth standards are specified by the Bluetooth Special Interest Group and are presently available under https://www.bluetooth.com/. A cellular network may for example be mobile phone network like a 2G/3G/4G/5G cellular communication network. The 2G/3G/4G/5G cellular radio communication standards are developed by the 3GPP and presently available under http://www.3gpp.org/. WLAN is for example specified by the standards of the IEEE 802.11 family (http://www.ieee.org/).

Such a subset of a radio map or a global radio map may for instance be pushed by the apparatus according to the first exemplary aspect, e.g. from a remote server for a(n) (geographic) area of interest (e.g. a small area around the current location, or for a whole country, to name but a few non-limiting examples) out of a global radio map comprised a plurality of such subsets, e.g. to a respective tracking device. Then, the apparatus according to the first exemplary aspect may include the downloaded radio map in a configuration that may be provided to the tracking device. Such a radio map can further be pre-installed to the tracking device during the manufacturing, but even in that case the data comprising the (e.g. global) radio map may be needed to be refreshed at some point, e.g. by providing the configuration comprising a respective radio map to the tracking device.

Prior to providing the configuration to the tracking device, one or more pre-requisites may be set. The setting of the one or more pre-requisites may be performed and/or controlled by entering corresponding information, e.g. by a human operator. The setting of the one or more pre-requisites may represent a planning and/or modelling of a transportation route respectively transportation chain. The transportation route respectively transportation chain may be divided into one or more segments. The one or more segments may be logical segments. A respective segment may represent a certain part of an area along the transportation route. For instance, a segment may represent a harbor, port, warehouse, storage facility, and/or a medium such as water (e.g. one or more seas), route network, one or more streets, one or more railway tracks along which a transportable asset is intended to be transported. Since the tracking device is attachable or is attached to the transportable asset, the tracking device, thus, travels the along the same transportation route. A respective segment may be assigned to a specific mode of transport, such as airfreight, ocean freight, cargo truck, or a combination thereof, to name but a few non-limiting examples.

A transition between two segments of one or more segments respectively the plurality of segments may for instance trigger a providing of a new configuration from the apparatus according to the first exemplary aspect to the respective tracking device.

The apparatus according to the first exemplary aspect is configured to provide such configuration to a plurality of (different) tracking devices. The providing of the is respective configuration may be performed and/or controlled via a communication interface, such as e.g. a cellular communication network and/or a non-cellular communication network (e.g. WLAN, satellite communication, or the like). A cellular network may for example be mobile phone network like a 2G/3G/4G/5G cellular communication network. The 2G/3G/4G/5G cellular radio communication standards are developed by the 3GPP and presently available under http://www.3gpp.org/. WLAN is for example specified by the standards of the IEEE 802.11 family (http://www.ieee.org/).

This may allow that an efficiency of the method according to the first aspect in comparison to known solutions is improved. Further, this may allow that a possibility to e.g. re-configure a tracking device is integrated into a normal data ingestion process. The re-configuration of a respective tracking device may be achieved by providing a (e.g. new or updated) configuration to the tracking device.

Automatic provisioning of the segment specific settings into the tracking device as part of the segment transition flow (i.e. when a new segment is started) may be allowed in this way.

The tracking device report is at least indicative of a position of a tracking device. The tracking device report is received from a respective tracking device. Prior, as disclosed above, the respective tracking device may generate the tracking device report based, at least in part, on a configuration that is provided to the respective tracking device.

According to an exemplary embodiment of the first exemplary aspect, the method further comprises prior to receiving the tracking device report:
providing an initial configuration associated with the tracking device to the tracking device, wherein the initial configuration is at least indicative of a sample gathering interval and a tracking device report (e.g. sample) sending interval.

Such an initial configuration may also be stored on a respective tracking device in the manufacturing process ensuring that the respective tracking device is ready for use.

The sample gathering interval may refer to a time interval. If such a sample gathering interval has lapsed, the tracking device may for instance gather (e.g. measure) information e.g. with one or more sensors comprised by or connectable to the tracking device. The tracking device may store such gathered (e.g. measured) information in a memory comprised by or connectable to the tracking device.

The tracking device report (e.g. sample) sending interval may refer to another time interval, which may also be the same as the sample gathering interval. If this time interval has lapsed, the tracking device may generate a respective tracking device report (e.g. based on a determined position estimate and/or one or more information gathered by its one or more sensors), and send the tracking device report to the apparatus according to the first exemplary aspect so that the apparatus according to the first exemplary aspect receives the tracking device report.

The segment along a transportation route comprising a plurality of segments to which the position of the tracking device report corresponds to, is determined based, at least in part, on the tracking device report. For instance, it may be determined based, at least in part, on a (e.g. geographic map) if the position respectively position estimate of the tracking device report is located in a specific segment of the plurality of segments. Such a map may be retrievable by the apparatus performing and/or controlling the method according to the first exemplary aspect.

According to an exemplary embodiment of the first exemplary aspect, the method further prior to providing the configuration to the tracking device comprises:
determining the configuration based on the segment of the plurality of segments in which the tracking device is located.

The configuration may be retrieved from a memory (e.g. database) comprised by or connectable to the apparatus according to the first exemplary aspect. Additionally or alternatively, the apparatus according to the first exemplary aspect may request the configuration from another entity (e.g. a positioning server or positioning server cloud being part of a location-based service of a service provider) based, at least in part, on the determined segment. In response, the apparatus according to the first exemplary aspect may receive the respective configuration.

The configuration is provided (e.g. sent) to the tracking device. The configuration may be provided by pushing the configuration to the tracking device. Such a pushing may also be understood as a server push in which the configuration is "pushed"—thus transferred—from the apparatus according to the first exemplary aspect to the tracking device, wherein the transfer is initiated by the apparatus according to the first exemplary aspect.

The configuration is associated with the determined segment. The configuration is indicative of segment specific settings. Thus, the configuration may be different from the initial configuration that may be stored onto the tracking device during its manufacturing.

The configuration may be provided to the tracking device based on one or more event triggers. For instance, the configuration may be provided to the tracking device if a segment change of the tracking device along its transportation route or a complete change of a transportation route per se has occurred. Additionally or alternatively, the configuration may be provided to the tracking device if an updated configuration for a current segment is available, to name but one further non-limiting example.

The method according to the first exemplary aspect may be triggered when a respective tracking device report is received. When such a tracking device report is received, there is according to a used communication protocol a possibility to provide data back to the tracking device, such as the configuration. In this way, an up-to-date configuration can be provided to the tracking device as it is required. This may allow that the method according to the first exemplary aspect is performed and/or controlled a plurality of times during a transportation of a transportable asset to which a respective tracking device is attached. Since a provided configuration may represent different segment specific settings, it may be enabled, (although a respective tracking device may have limited capabilities with regard to memory/storage size, energy consumption, etc.), to enhance the quality of the tracking device reports provided by a respective tracking device. For instance, if a tracking device is located inside of a warehouse, there is no need that the tracking device provides a tracking device report e.g. every hour. A new tracking device report having meaningful information for a user (e.g. recipient of the transportable asset) may be present if the tracking device has left the warehouse. In this case, for instance, a respective configuration may put the tracking device into a sleep mode, e.g. by setting the sample gathering interval and/or the tracking device report (e.g. sample) sending interval to a value of zero, meaning that no samples (e.g. information) are gathered by the one or more sensors of the tracking device and/or that no tracking device reports are provided (e.g. sent) by the tracking device. Even further, the configuration may comprise another setting turning off the communication interface of the tracking device, e.g. at least for a certain time interval (e.g. one day, or the like) after which the tracking device may wake up and determine its position to determine if it (the tracking device) has left the warehouse. The tracking device (e.g. tracker) may be configured (e.g. by the configuration) e.g. to wake up in response to experiencing movement(s) (e.g. determined based on gathered information of an accelerometer (sensor)), or other sensor value(s) that may be gathered by the sensor(s) of the tracking device. For instance, it may be determined if such a gathered (e.g. measured) value is exceeding a threshold (e.g. large temperature difference, significant altitude change, etc.). If the threshold is exceeded, e.g. such a wake up of the tracking device may be performed and/or controlled.

This may allow better data handling between the apparatus according to the first exemplary aspect and the tracking device respectively a plurality of tracking devices and power efficiency of the tracking device. Further, this may allow instant responses to significant events (e.g. arrival to destination/waypoint), and/or improved data accuracy in the form of a respective tracking device report, e.g. when it matters (not inside of a warehouse, as disclosed above).

According to an exemplary embodiment of the first exemplary aspect, the method further comprises:
providing one or more further configurations associated with one or more segments that are expected to follow after the determined segment along the transportation route of the tracking device.

In addition to the configuration that is provided to the tracking device, e.g. simultaneously, one or more further (thus, other) configurations can be provided to the tracking device. Such one or more further configuration may be associated with one or more segments that are expected to follow after the determined segment for which the configuration is provided.

According to an exemplary embodiment of the first exemplary aspect, the method further comprises:
determining memory capabilities of the tracking device; wherein the number of the one or more further configurations provided to the tracking device is dependent upon the memory capabilities of the tracking device.

If and how many further configurations can be provided to the tracking device, may depend upon e.g. available storage size of the tracking device. Thus, prior to the providing of the one or more further configurations, the method may further comprise:
requesting one or more capabilities from the tracking device; and
determining the one or more further configuration that are providable to the tracking device based, at least in part, on the one or more capabilities that may be received in response to the requesting of the one or more capabilities.

Since a respective tracking device may be of low capability due to cost related manufacturing, a respective tracking device may comprise or be connectable to a rather small memory/storage size for storing the configuration and optionally, the one or more further configurations.

As disclosed above, a transportation route of a transportable asset may be divided into the plurality of segments. Since it is determined in which segment the tracking device (e.g. attached to the transportable asset) is located, the next (expected) segment(s) can be determined. The corresponding configuration(s) associated with this (these) segment(s) can then be provided (e.g. pushed) to the tracking device. The one or more further configurations may be provided to the tracking device together with the configuration associated with the segment in which the tracking device is (currently) located.

Further, at least one of the one or more further configurations may be a default configuration, which may be applied by the tracking device in case the tracking device is unable to establish a connection to be provided with a respective configuration suitable for a current segment in which the tracking device is located. For instance, in a scenario in which the tracking device has enough memory for e.g. a plurality of (e.g. three) configurations corresponding to (e.g. three) segments of the transportation route, the tracking device may be unable to connect (e.g. no data service available, or communication network available) for e.g. five (further) segments of the transportation route. Then, the tracking device may use such a default configuration. Alternatively or additionally, the tracking device may apply the configuration corresponding to the last segment (e.g. the third segment of a transportation route) for which it has been provided with (thus, received) a respective configuration.

According to an exemplary embodiment of the first exemplary aspect, the method further comprises:
providing one or more further configurations associated with one or more geofences that are expected to follow after the determined segment along the transportation route to the tracking device.

A respective geofence may be understood as a virtual border of a geographical area, wherein the tracking device is enabled to determine when a current location of the tracking device has crossed between inside and outside of such a geofence. A respective geofence may be defined by a circle with a center determined by a coordinate (e.g. latitude and longitude, or x-, and y-coordinates) and having a radius. Such a geofence may have an outer shape different from a circle. For instance, a polygon may be defined by respective coordinates of its outer edges, to name but one non-limiting example. Such a geofence definition may be used e.g. when GNSS positioning is available or active on part of the tracking device. However, such a geofence definition may require a computationally intensive translation between a geographical and radio map definitions of both.

Additionally or alternatively, a respective geofence may be defined by a combination of one or more identifiers of access points or radio nodes (e.g. MAC addresses corresponding to access Points and/or radio nodes) and (e.g. expected) received signal strengths (RSS). With regard to a geofence definition based on coordinates, the combination reduces a computational requirement by respective tracking device to determine whether or not it is located within a respective geofence. For instance, if a respective tracking device finds that the received radio signals are within or out of bounds defined by the geofence, the respective tracking device may determine (e.g. estimate) if they are in or outside the geofence.

When the tracking device determines it is leaving or entering such a geofence comprised by the segment, the tracking device may perform a pre-defined action, such as providing a generated tracking device report. Additional actions such as waking up or powering down high power consuming sensors and/or processors or the like may also be performed and/or controlled dependent upon the tracking device entering or leaving a respective geofence. Such one or more actions may be associated with a specific geofence. A segment of the plurality of segments may comprise one or more of such geofences.

It will be understood that such one or more geofence, and optionally, one or more of such actions associated with a respective geofence may be part of the configuration that is provided by the apparatus according to the first exemplary aspect to the tracking device.

In addition or in the alternative, the one or more configurations may be associated with one or more geofences that are expected to follow after another geofence within the determined segment along the transportation route of the tracking device.

If a tracking device report is received, wherein the position of the tracking device report does not match to an expected position along the transportation route, the tracking device may apply a configuration (e.g. default configuration) in which e.g. the one or more sensor(s) of the tracking device are turned on. This may allow to obtain an accurate position in a subsequent tracking device report. However, this may sacrifice battery life of the tracking device.

Additionally or alternatively, in case a respective position of a respective tracking device report does not match to an expected position along the transportation route, one or more of the following steps/actions may be performed and/or controlled:

- If e.g. a geofence of a later waypoint (e.g. segment or within a segment) is triggered (e.g. one or more waypoints are skipped), it may be continued that the tracking device applies (e.g. still) the previous configuration. Further, the tracking device may raise (e.g. by outputting or providing) an alarm and/or notification to one or more users;
- If the position that does not match to an expected position along the transportation route, e.g. the position is way off (e.g. based on a pre-defined threshold), the position that does not match to an expected position may be considered to represent an outlier. In that case, the configuration applied by the tracking device may be changed so that the tracking device gathers (e.g. collects) location information using (e.g. all) the possible methods (by utilizing its one or more sensors) and reporting back in a short interval, e.g. by providing a tracking device report. Alternatively, a last known position may be assumed to be the correct position of the tracking device.

According to an exemplary embodiment of the first exemplary aspect, a respective segment is associated with (e.g. defined by) a geofence covering a geographic area along the transportation route. The outer shape of the geofence may match with or correspond to the outer shape of the segment. Alternatively, a respective segment may be defined by a plurality (e.g. at least two) of geofences (e.g. virtually) bordering the geographic area that is defined as a respective segment along the transportation route.

According to an exemplary embodiment of the first exemplary aspect, the method further comprises:
determining or adapting the configuration associated with the segment.

The configuration may be determined or adapted, e.g. as described above. One example may be an input performed by a human operator. The configuration may be determined or adapted anytime. The configuration may comprise or be associated with a time stamp enabling version management of respective configuration(s) associated with a respective segment.

The determining or adapting of the configuration may comprise setting up certain settings for the respective segment. Those are referred to as segment specific settings. In this way, for a respective segment, a unique set of settings may be assigned. The set of settings may thus differ between the plurality of segments along the transportation route. This may allow to define what information are comprised by a tracking device report. Also, this may allow to enhance efficiency of a respective tracking device, since e.g. battery consumption and capabilities can be matched up to the respective basic parameters that are a given in a respective segment of the plurality of segments along the transportation route.

According to an exemplary embodiment of the first exemplary aspect, the configuration comprises one or more of the following segment specific settings:
i) one or more geofences of the segment;
ii) one or more associated radio maps of the segment;
ii) one or more sensor rules that trigger data ingestion of the segment; and
iii) a sample gathering interval and a tracking device report (e.g. sample) sending interval.

The segment specific settings that may be comprised by the configuration may for instance be one or more geofences that are located within the segment. Further, one or more (e.g. partial) radio maps of the segment may be comprised enabling the tracking device to determine its position based, at least in part, on a Radio Frequency (RF) fingerprint (e.g. one or more identifiers of radio nodes that are observable at a current location of the tracking device and/or one or more received signal strength values of one or more radio signals (e.g. sent by WiFi access points and/or BLE beacons or the like) that are observable by the tracking device at its current location).

The segment specific settings that may be comprised by the configuration may for instance be one or more sensor rules that trigger data ingestion of the segment. For instance, it may defined which sensor(s) of the one or more sensors comprised by or connectable to the tracking device may be activated and gather (e.g. measure) respective information when the tracking device is located in the respective segment. For instance, this setting may specify which sensor(s) of one or more sensors comprised by or connectable to the tracking device are active or not-active, such as temperature sensor, barometer sensor, accelerometer, GNSS receiver respectively transceiver, WiFi- and/or BLE-receiver respectively transceiver, shock sensor, or a combination thereof, to name but a few non-limiting examples.

The sample gathering interval and a tracking device report sending interval refer to the same definition defined above in conjunction with the initial configuration of a tracking device.

Further, the segment specific settings may comprise a setting specifying a sleep mode of the tracking device in the segment (or a geofence of the segment) associated with the configuration. For instance, one or more sensors of the tracking device may not be active and be put into a sleep mode, and/or the tracking device may not determine its position (e.g. at all) when it is located within the respective segment (or a geofence of the segment), to name but a few non-limiting examples. If a respective tracking device is put and/or set into a sleep mode, there is a need to wake it up again. One possibility may be turn keep a shock sensor active so that when the tracking device is moved, it will wake up again and then power on one or more further sensors, GNSS and/or WiFi receiver respectively transceiver. Such a corresponding setting may also be comprised by the configuration (and also the one or more further configurations) as one of the segment specific settings.

Segment specific settings may include, but not being constrained to following: Enabled positioning methods (e.g. GNSS, WiFi, Cell, BLE etc.), enabled sensor(s) (e.g. accelerometer, thermometer, barometer, tampering sensors etc.), tracking settings (e.g. sampling and sending intervals, reporting mode etc.), (e.g. offline) geofences, (e.g. offline) rules (e.g. sensor rules that trigger instant data ingestion in case of incident such as shock or temperature exceeding a predefined threshold), or a combination thereof.

Further, different sensor rules may be beneficial to be applied: A respective segment may need to apply different rules or thresholds, such as which sensor(s) of the tracking device is (are) useful in the current segment to be enabled. Optimal tracking device settings such as tracking mode and sampling and sending frequency may be defined by the segment specific settings, based, at least in part, on the following understanding:

Higher sampling and sending frequencies may lead to reduced latencies, but higher battery consumption and higher data transfer rates which may have cost impact on part of the tracking device.

Lower sampling and sending frequencies may lead to increased latencies and missing of important events that may occur along the transportation route and a receiver of the tracked transportable asset may be interested in it, but it may also reduce battery consumption and data transfer rates enabling to keep the tracking device alive longer. This may support tracking along transportation routes taking quite some time, such as international ocean freight to name but one non-limiting example.

According to an exemplary embodiment of the first exemplary aspect, the configuration is provided to the tracking device over a wireless interface (e.g. an air interface) respectively via a wireless communication network.

Such a wireless interface may be configured according to cellular, WLAN, Wide Area Network (WAN) communication standard, other wireless communication standard, or a combination thereof. Equally, such a wireless communication network may for instance be a cellular communication network, a WLAN, and/or Wide Area Network (WAN) communication network, other wireless communication standard, or a combination thereof, to name but a few non-limiting examples. It will be understood that both the apparatus according to the first exemplary aspect and the respective tracking device may be configured to communicate via the respective wireless communication network.

According to an exemplary embodiment of the first exemplary aspect, the method further comprises:

determining if the tracking device is located inside a geofence based, at least in part, on the tracking device report; and providing the configuration associated with the geofence if the tracking device is located inside the geofence to the tracking device.

This may allow to attach the respective configuration to be provided dependent upon a geofence. For instance, if the respective tracking device determines (e.g. decides) it is inside a respective geofence, then the configuration associated with a geofence can be provided (e.g. pushed) to the respective tracking device.

For instance, if a shipment plan for a transportable asset to be monitored/tracked by a respective tracking device is modelled as one or more separate segments based on mode of transport, it is enabled to define a unique configuration regarding the tracking device settings and associated sensor and location-based rules that best suit the given circumstances with a respective segment. It is further possible by the method according to the first exemplary aspect or a system according to another exemplary aspect to e.g. automatically adapt the tracking device specific configuration that is provided to the tracking device e.g. based on a knowledge which segment of the shipment respectively along the transportation route is being currently "executed" to transport the transportable asset from its source location to its destination location. A respective service may use mechanisms as disclosed for a provisioning of the (e.g. new) configuration to the tracking device e.g. just-in-time (e.g. at the time of transitioning from one segment to another by the tracking device). However, it is also possible to e.g. pause the tracking of the tracking device entirely or restrict the gathering of information to be generated into the tracking device report (e.g. measured or collected data by the tracking device), e.g. restrict the gathering to sensor data in case there are better sources for e.g. location data for a given segment, to name but one non-limiting example.

The features and example embodiments described above may equally pertain to the different aspects.

It is to be understood that the presentation in this section is merely by way of examples and non-limiting.

Other features will become apparent from the following detailed description considered in conjunction with the accompanying drawings. It is to be understood, however, that the drawings are designed solely for purposes of illustration and not as a definition of the limits, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

Figure 1:
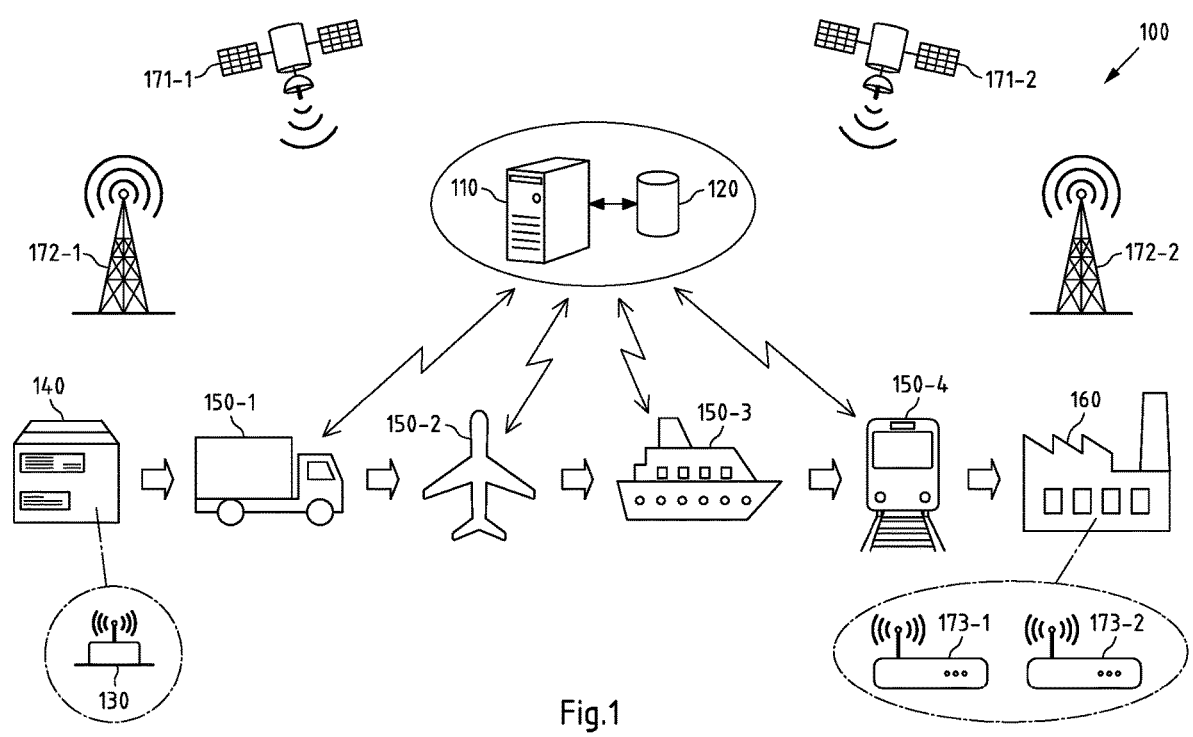
FIG. 1 a schematic block diagram of a system according to an exemplary aspect.

The following description serves to deepen the understanding and shall be understood to complement and be read together with the description as provided in the above summary section of this specification.

System 100 is configured to provide a tracking service, e.g. enabled by the comprised server or server cloud 110. Such a tracking service may be part of a location-based service. In case server 110 is a server cloud, the server comprises one or more servers (not shown in FIG. 1) providing services at least partially jointly. The system 100 comprises an optional database 120 that is connected to the server 110, or that may be comprised by the server 110. In the latter case, the server 110 and the database 120 may form a single entity. Both the server 110 and the optional database 120 may be part of above disclosed server cloud.

The system 100 may further comprise a transportable asset 140 (e.g. a shipment) that is to be tracked by the tracking service. The system 100 further comprises one or more transportation vehicles, e.g. transportation vehicles 150-1 to 150-4 from which four different exemplary representations are shown: a truck 150-1, a cargo airplane 150-2, a cargo ship 150-3, and a freight train 150-4, to name but a few non-limiting examples.

The transportable asset 140 comprises a tracking device 130. The tracking device 130 may be attached to the box of the transportable asset 140. For instance, the tracking device may be glued to a box of the transportable asset 140.

The transportable asset 140 may be a single shipment, or a container, a palette or the like comprising (e.g. carrying) multiple (at least two) of such transportable assets 140.

To enable position determining by the tracking device 130, system 100 further comprises one or more entities of a GNSS-based and/or non-GNSS-based positioning system enabling e.g. the physical tracking device 130 to determine one or more position estimates. For instance, entities of a GNSS-based positioning system are satellites 171-1, 171-2. Entities of a non-GNSS-based positioning system are base stations 172-1, 172-2 of a cellular communication network, and beacon/access points 173-1, 173-2 (e.g. according to wireless and/or BT and/or BLE and/or WLAN communication standards), which are in the example embodiment of FIG. 1 installed within the factory 160 to which the transportable asset 140 is to be transported as one of the four segment of its transportation route. The first segment of a plurality of segments is fulfilled by the transportation vehicle 150-1 transporting the transportable asset 140 from its origin location (e.g. factory where the respective good(s) is (are) manufactured) to its destination location in the factory 160. The second segment of the plurality of segments is fulfilled by the transportation vehicle 150-2. The third segment of the plurality of segments is fulfilled by the transportation vehicle 150-3. The fourth segment of the plurality of segments is fulfilled by the transportation vehicle 150-4.

Example embodiments enable that while the transportable asset 140 comprising the tracking device 130 gathers information (e.g. its position and one or more further information gathered by one or more sensors that are comprised by the tracking device (e.g. temperature, shock information)) and provides such information as tracking device reports to the server 110. The server 110 determines in which segment of the above mentioned four segments the tracking device 130, and thus also the transportable asset 140 is currently located, and provides a respective configuration to the tracking device 130 that matches to the determined segment. If the tracking device 130 changes a segment, e.g. from being transported by the truck 150-1 to being transported by the plane 150-2, a respective tracking device report is provided by the tracking device 130 to the server 110. The server 110 then determines that the tracking device is now located in a new segment, here the second segment, and provides a corresponding configuration that is associated with the second segment. For instance, since the second segment is a part where the transportable asset 140 is transported by the plane 150-2, the tracking device 130 may not be required to determine its position as frequently as it may have done it when it was transported by the truck 150-1 in the first segment. Also, the tracking device 130 may not be required to gather e.g. temperature information since in the place 150-2, there governs pre-defined environment conditions. Also, providing of a respective configuration to the respective tracking device within the plane 150-2 may not be required due to a lack of communication connection. Thus, the frequency to provide generated tracking device report(s) may be set to a lower value compared to the corresponding setting during the first segment. A respective configuration that changes the frequency how often the tracking device 130 gathers the information as set by the configuration, as disclosed above, how often the tracking device 130 determines its position, and how often the tracking device 130 provides a generated tracking device is thus provided to the tracking device 130 as soon as the server 110 has determined that the tracking device 130 has entered the second segment.

The system 100 may optionally comprise one or more positioning relay systems or one or more positioning relay devices (not shown in FIG. 1) enabling that a specific configuration is relayed to the respective tracking device 130. Such positioning relay systems or positioning relay devices may be comprised by a transportation vehicle, such as planes, trucks, ships, or the like. Alternatively or additionally, such a positioning relay system or positioning relay device may also provide connectivity to the tracking device. The configuration there may comprise a SSID and a password for the respective positioning relay system or positioning relay device so that the tracking device 130 can establish a connection to the positioning relay system or positioning relay device. Also, such a positioning relay system or positioning relay device may be utilized as means of connectivity and/or means of infrastructure as a "proximity geofence". One example may be a vehicle's WiFi and/or BLE Access Point. In case the tracking device 130 is within a geofence covering a coverage area of a respective WiFi and/or BLE Access Point, then the tracking device 130 may establish a connection to the respective WiFi and/or BLE Access Point. Then, via this connection, e.g. tracking device report(s) may be provided and/or one or more configuration and/or one or more further configuration may be received by the tracking device 130.

Figure 2:
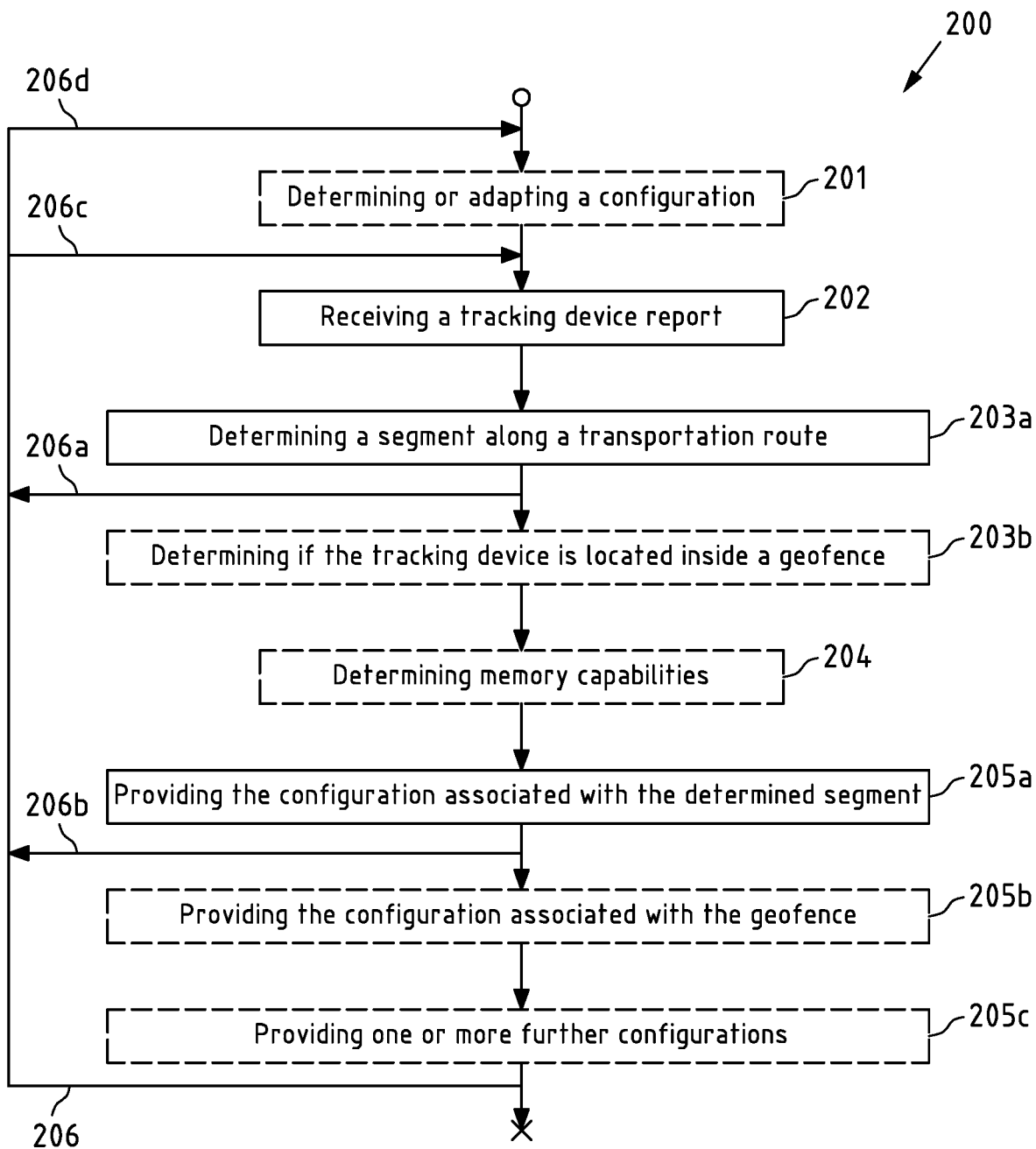
FIG. 2 a flowchart showing an example embodiment of a method according to the first exemplary aspect.

FIG. 2 is a flowchart 200 showing an example embodiment of a method according to the first exemplary aspect. This flowchart 200 may for instance be performed by a server, a radio unit, and/or an electronic device, e.g. server 110, radio unit 150-1, 150-2, or electronic device 130 of FIG. 1.

In an optional first step 201, the configuration is determined or adapted. The configuration may be determined e.g. when one or more segments of a transportation route are pre-defined, e.g. as a part of pre-requisites. Also, a respective configuration for a segment may be updated. The determining and/or the adapting of the configuration may be done by an operator, e.g. by entering one or more segment specific settings, as disclosed above. The configuration may then be stored in a memory, e.g. database 120 of FIG. 1 that is connectable to or comprised by server 110 of FIG. 1.

In a second step 202, a tracking device report is received. The tracking device report is received from a respective tracking device (e.g. tracking device 130 of FIG. 1). The tracking device report may be received via a communication network, e.g. via the cellular communication network comprising base stations 172-1, 172-2 of FIG. 1, or via a wireless communication network, such as a WLAN or BT communication network if available to or the tracking device has access to such a communication network at the time it sends the tracking device report.

In a third step 203a, a segment along a transportation route is determined. The tracking device report received in step 202 comprises a position of the respective tracking device that the respective tracking device has determined prior to providing the tracking device to the server performing and/or controlling the flowchart 200.

In an optional step 203b, it is determined if the tracking device is located inside a geofence. Further, it may not only be determined in which segment the respective tracking device is located/positioned, but also in which geofence the respective tracking device is located. For instance, a respective segment of the plurality of segments may comprise more than one geofence that may be linked to a specific incident that can occur during the transportation of a transportable asset comprising the respective tracking device. For instance, a geofence may cover a warehouse so that it may be known when the respective tracking device continues its journey via a transportation vehicle and, thus, has left the warehouse in which it was temporarily kept/stored (together with the transportable asset).

In an optional fourth step 204, memory capabilities of the tracking device are determined. For instance, to determine whether or not one or more further configuration of segments that are expected to follow after a segment in which the respective tracking device is currently located, it may be determined e.g. a memory/storage size of the respective tracking device. To obtain (e.g. receive) such information enabling to determine memory capabilities of the respective tracking device, e.g. a corresponding request may be provided (e.g. sent) to the tracking device. This may be enabled after a respective tracking device report is received (step 202) opening up the opportunity to send (e.g. by a push method) such a request to the respective tracking device. Then, in a next tracking device report, the respective tracking device may include its (e.g. memory) capabilities.

In a fifth step 205*a*, a configuration associated with the determined segment is provided, e.g. by pushing the configuration to the respective tracking device. The configuration may be retrieved from a memory, in which the respective configuration is stored. The configuration may be provided to the tracking device by pushing the configuration to the respective tracking device. Thus, the configuration may be sent to the respective tracking device by a push method. This may be enabled after a respective tracking device report is received (step 202) opening up the opportunity to send (e.g. by a push method) the configuration to the respective tracking device.

In an optional step 205*b*, the configuration associated with the geofence is provided. If step 205*b* is performed and/or controlled may be linked to step 203*b*. It may be beneficial if it is determined in which geofence a tracking device is located prior to provide a configuration that is associated with the respective geofence to the tracking device.

In an optional step 205*c*, one or more further configurations of segments that are expected to follow after the one determined in step 203*a*, are provided to the tracking device in advance.

The flowchart 200 may be performed and/or controlled multiple times (e.g. at least twice). This is illustrated by the arrows 206*c* and 206*d* pointing back to step 201 respectively step 202. Also, if it is determined in step 203*a* that the tracking device is still within a same segment for which the tracking device already comprises (or has been provided) the correct configuration, then the execution of the flowchart 200 may be stopped and another run may be initiated. This is illustrated in flowchart 200 by the arrow 206*a* pointing back to steps 201/202. The same applies if in step 205*a* the configuration is provided that is associated with the segment. Then, it may be optional to provide another configuration that is associated with a geofence, and/or to provide one or more further configuration of one or more segments that are expected to follow after the current segment along the transportation chain/route.

Figure 3:
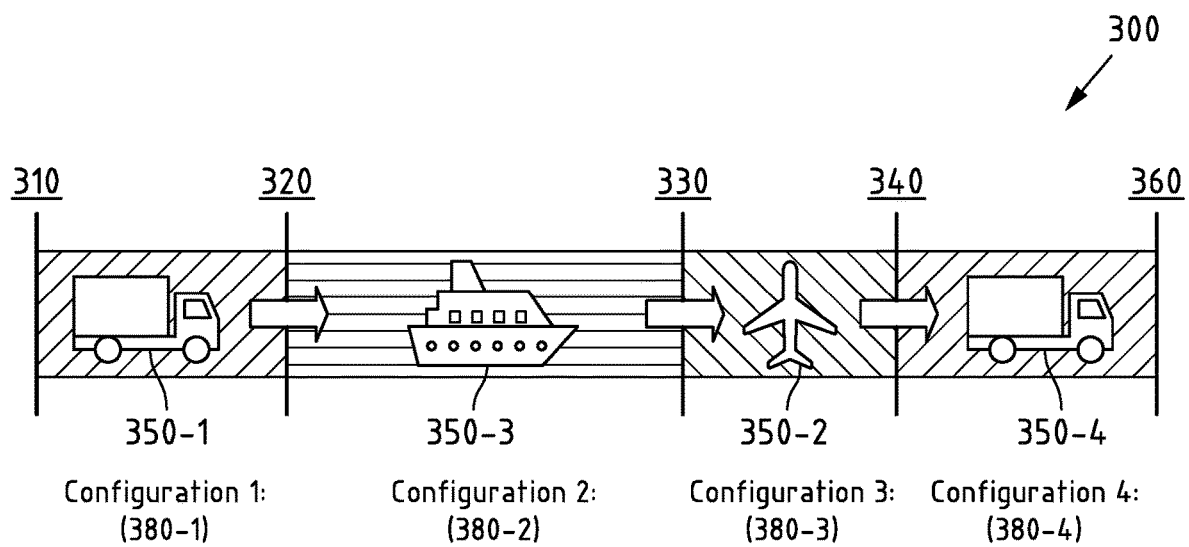
FIG. 3 a schematic transportation route as used in example embodiments according to all exemplary aspects.

FIG. 3 shows a schematic transportation chain respectively route 300 as used in example embodiments according to all exemplary aspects. Such an exemplary transportation route 300 may be encountered by a transportable asset (e.g. transportable asset 140 of FIG. 1) during its transportation.

The transportation chain 300 comprises four segments, segment 1 in which the transportable asset is transported by a truck 350-1, followed by segment 2 in which the transportable asset is transported by a ship 350-3, followed by segment 3 in which the transportable asset is transported by a plane 350-2, and followed by segment 4 in which the transportable asset is transported by another truck 350-4.

At the start of the first segment, the transportable asset starts its journey from its origin location. The start of segment 2 is simultaneously the destination of segment 1, and so on. At the end of segment 4, the transportable asset may have reached its end of journey.

In a respective segment, a corresponding configuration is provided to a respective tracking device that is attached to the transportable asset.

In the first segment, the configuration 380-1 is provided to the tracking device. Configuration 380-1 the following one or more of the following segment specific settings may be set:
geofences A, B;
rules: 1, 2, 3, 5, wherein a respective rule of such rules 1 to 5 may define e.g. sensor rules that trigger instant data ingestion in case of a pre-defined incident such as shock or temperature exceeding a pre-defined threshold;
sensors: GNSS, WiFi, Temperature, Shock;
intervals:
Sample: 5 min
Send: 5 min In the second segment, the configuration 380-2 is provided to the tracking device. Configuration 380-2 the following one or more of the following segment specific settings may be set:
geofences B, C;
rules: 1, 2, 5;
sensors: GNSS, Temperature, Shock;
intervals:
Sample: 5 min
Send: 24 h In the third segment, the configuration 380-3 is provided to the tracking device. Configuration 380-3 the following one or more of the following segment specific settings may be set:
geofences C, D;
rules: 1, 2, 4, 5;
sensors: WiFi, Temperature, Shock;
intervals:
Sample: 5 min
Send: disabled In the fourth (and final) segment, the configuration 380-3 is provided to the tracking device. Configuration 380-3 the following one or more of the following segment specific settings may be set:
geofences D, E;
rules: 1, 2, 3, 5;
sensors: GNSS, WiFi, Temperature, Shock;
intervals:
Sample: 5 min
Send: 5 min It can be seen that the respective geofences that two neighboring segments have configured by the configuration may overlap. The rules that are defined may be associated with the used transportation vehicle, e.g. rules 1, 2, 3, 5 are used when the transportable asset is transported by a truck, rules 1, 2, 5 when the transportable asset is transported by a ship, etc.

In this way, better data and power efficiency, instant responses to significant events (e.g. arrival to destination/waypoint), and/or improved data accuracy when it matters can be achieved.

If a shipment plan is modelled as separate segments based on mode of transport, it enables to define unique configuration(s) regarding tracker setting(s) and associated sensor and location-based rule(s) that best suit the given circumstances. It is then possible for a respective system (e.g. performing and/or controlling the method according to the first exemplary aspect) and/or a respective apparatus (e.g. performing and/or controlling the method according to the first exemplary aspect) to automatically adapt the tracker specific configuration based on the knowledge of which segment of the shipment is being executed now. The service can use the existing mechanisms for provisioning the new configuration to the tracker just-in-time (e.g. at the time of transitioning from one segment to another). It is also possible to pause the tracking entirely or restrict the collected data e.g. to sensor data only in case there are better sources for e.g. location data for a given segment.

Pre-Requisites:
 Tracking system supports planning and modelling a shipment by dividing it into logical segments
  Segments can be assigned a specific mode of transport
  Segment transitions can be automated Such segments may be contiguous segments. Such a segment may correspond to a same mode of transportation. Such contiguous segments may be on a same mode of transport. During a same mode of transportation, the respective tracking device may apply different configurations, e.g. based on a certain trigger event.

A same mode of transportation may be understood to a duration a respective tracking device is located upon and/or within a same transportation vehicle. For instance, while the respective tracking device is on a plane (e.g. the duration that the respective tracking device is on a plane may be understood as such a same mode of transport), during take-off, taxiing, and/or landing, the respective tracking device may use e.g. cell signals to obtain a coarse location (e.g. at the airport, since the plane is still on the ground), e.g. as specified by a respective configuration. Further, while the respective tracking device is (e.g. still) on the plane, e.g. while being in air (e.g. change between plane being on ground and being in the air may be a trigger event), the respective tracking device may revert to e.g. sensor(s) like accelerometer and/or altimeter (e.g. only), e.g. as specified by another configuration. In the latter case, the respective tracking device may not be able to find any signal while the plane is in the air. However, e.g. the plane's WiFi signal(s) or positioning is relay may be available. In another example, while the respective tracking device is on a truck (e.g. the duration a respective tracking device is on a truck may be understood as another example of a same mode of transport), and the transportable asset together with the tracking device is transported e.g. over border(s), the respective tracking device may alter a configuration e.g. to search for other cellular networks corresponding to the ones of the (e.g. current) country and/or region it entered due to the crossing of the border(s). Such a crossing of border(s) may be a trigger event based on which the respective tracking device may alter its applied configuration.

Trackers can be configured over-the-air
 Efficiency of the system is improved if possibility to re-configure a tracker is integrated into the normal data ingestion process
Enable assignment of unique set of settings with segments
 Settings could include but is not constrained to following:
  Enabled positioning methods (e.g. GNSS, WiFi, Cell, BLE etc.)
  Enabled sensors (e.g. accelerometer, thermometer, barometer, tampering sensors etc.)
  Tracking settings (e.g. sampling and sending intervals, reporting mode etc.)
  Offline geofences
  Offline rules (e.g. sensor rules that trigger instant data ingestion in case of incident such as shock or temperature exceeding a predefined threshold)
 Automatic provisioning of the segment specific settings into tracker as part of the segment transition flow (i.e. when a new segment is started).

Figure 4:
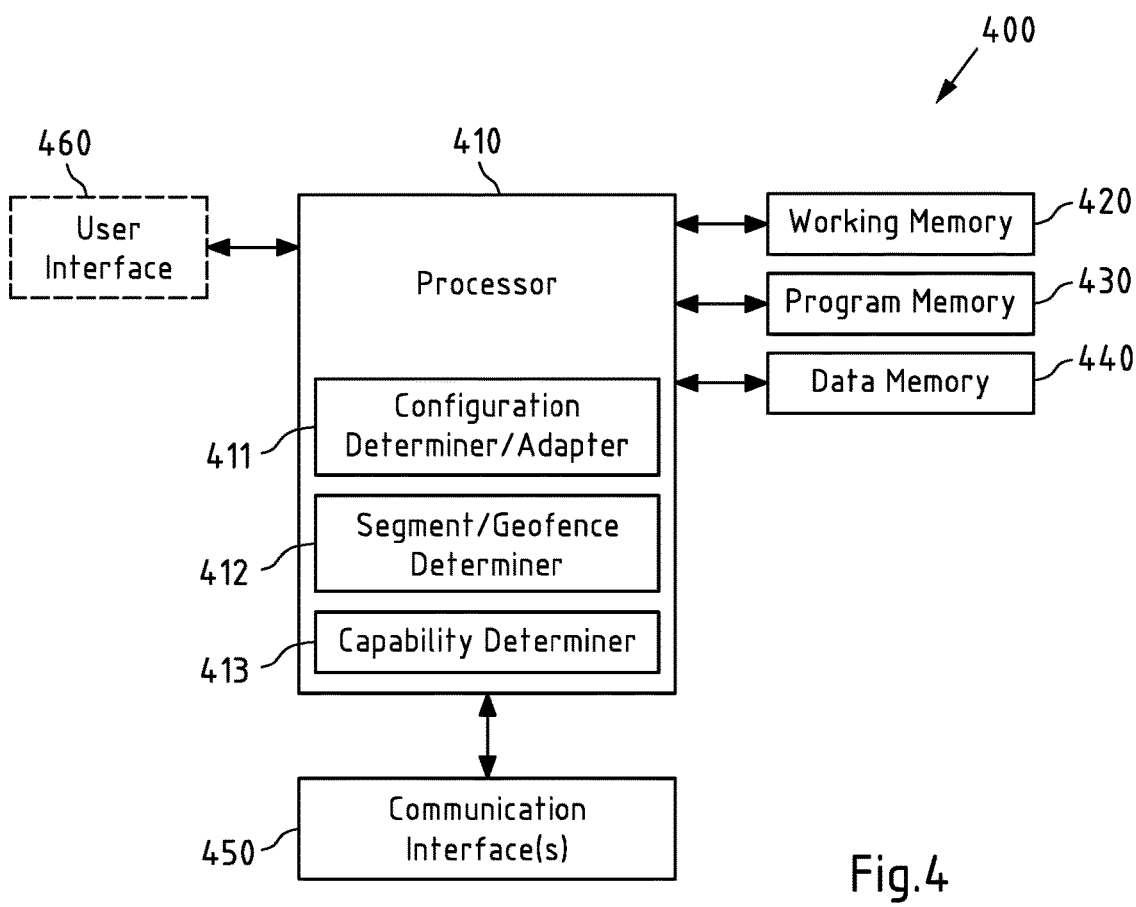
FIG. 4 a schematic block diagram of an apparatus configured to perform the method according to the first exemplary aspect.

FIG. 4 is a schematic block diagram of an apparatus 400 according to an exemplary aspect, which may for instance represent the server 110 of FIG. 1.

Apparatus 400 comprises a processor 410, working memory 420, program memory 430, data memory 440, communication interface(s) 450, and an optional user interface 460.

Apparatus 400 may for instance be configured to perform and/or control or comprise respective means (at least one of 410 to 460) for performing and/or controlling the method according to the first exemplary aspect. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspects.

Processor 410 may for instance comprise a configuration determiner/adapter 411 as a functional and/or structural unit. Configuration determiner/adapter 411 may for instance be configured to determine or adapt a configuration (see step 201 of FIG. 2).

Processor 410 may for instance comprise a segment/geofence determiner 412 as a functional and/or structural unit. Segment/geofence determiner 412 may for instance be configured to determine based, at least in part, on a received tracking device report, whether a respective tracking device (e.g. tracking device 130 of FIG. 1) is located within a segment/geofence (see step 203a, 203 of FIG. 2).

Processor 410 may for instance comprise a capability determiner 413 as a functional and/or structural unit. Capability determiner 413 may for instance be configured to determine one or more capabilities of a tracking device (see step 204 of FIG. 2).

Processor 410 may for instance further control the memories 420 to 440, the communication interface(s) 450, and the optional user interface 460.

Processor 410 may for instance execute computer program code stored in program memory 430, which may for instance represent a computer readable storage medium comprising program code that, when executed by processor 410, causes the processor 410 to perform the method according to the first exemplary aspect.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store one or more configurations, one or more further configurations, one or more tracking device reports, one or more transportation routes, one or more geofences, one or more capabilities, or a combination thereof, to name but a few non-limiting examples.

Communication interface(s) 450 enable apparatus 400 to communicate with other entities, e.g. with tracking device 130 of FIG. 1, and/or with one or more entities of a GNSS-based and/or non-GNSS-based positioning system, such as base stations 172-1, 172-2 of FIG. 1, and/or beacons respectively WiFi access points 173-1, 173-2 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet.

User interface 460 is optional and may comprise a display for displaying information to a user and/or an input device (e.g. a keyboard, keypad, touchpad, mouse, etc.) for receiving information from a user.

Some or all of the components of the apparatus 400 may for instance be connected via a bus. Some or all of the components of the apparatus 400 may for instance be combined into one or more modules.

The following embodiments shall also be considered to be disclosed:

Embodiment 1

A method comprising:
receiving a tracking device report at least indicative of a position of a tracking device;
determining a segment along a transportation route comprising a plurality of segments to which the position of the tracking device report corresponds to, based, at least in part, on the tracking device report; and
providing a configuration associated with the determined segment to the tracking device, wherein the configuration is indicative of segment specific settings for the tracking device, wherein the configuration is provided if a segment change along the transportation route has occurred, or if an updated configuration for a current segment not provided to the tracking device is available.

Embodiment 2

The method according to embodiment 1, the method further comprising:
providing one or more further configurations associated with one or more segments that are expected to follow after the determined segment along the transportation route to the tracking device.

Embodiment 3

The method according to any of the preceding embodiments, the method further comprising:
determining memory capabilities of the tracking device; wherein the number of the one or more further configurations provided to the tracking device is dependent upon the memory capabilities of the tracking device.

Embodiment 4

The method according to any of the preceding embodiments, wherein a respective segment is associated with a geofence covering a geographic area along the transportation route.

Embodiment 5

The method according to any of the preceding embodiments, the method further comprising:
determining or adapting the configuration associated with the segment.

Embodiment 6

The method according to any of the preceding embodiments, wherein the configuration comprises one or more of the following segment specific settings:
i) one or more geofences of the segment;
ii) one or more associated radio maps of the segment;
ii) one or more sensor rules that trigger data ingestion of the segment; and
iii) a sample gathering interval and a tracking device report sending interval.

Embodiment 7

The method according to any of the preceding embodiments, wherein the configuration is provided to the tracking device over a wireless interface.

Embodiment 8

The method according to any of the preceding embodiments, the method further comprising:
- determining if the tracking device is located inside a geofence (e.g. of the segment) based, at least in part, on the tracking device report; and
- providing the configuration associated with the geofence if the tracking device is located inside the geofence to the tracking device.

Embodiment 9

An apparatus configured to perform and/or control or comprising respective means for performing and/or controlling the method of any of the embodiments 1 to 8.

Embodiment 10

An apparatus comprising at least one processor and at least one memory including computer program code, the at least one memory and the computer program code configured to, with the at least one processor, cause an apparatus at least to perform and/or control the method of any of the embodiments 1 to 8.

Embodiment 11

An apparatus comprising at least one processor and at least one memory including computer program code, the at least one memory and the computer program code configured to, with the at least one processor, cause the apparatus to at least perform:
- receiving a tracking device report at least indicative of a position of a tracking device;
- determining a segment along a transportation route comprising a plurality of segments to which the position of the tracking device report corresponds to, based, at least in part, on the tracking device report; and
- providing a configuration associated with the determined segment to the tracking device, wherein the configuration is indicative of segment specific settings for the tracking device, wherein the configuration is provided if a segment change along the transportation route has occurred, or if an updated configuration for a current segment not provided to the tracking device is available.

Embodiment 12

The apparatus according to embodiment 11, the at least one memory and the computer program code configured to, with the at least one processor, cause the apparatus further to perform:
- providing one or more further configurations associated with one or more segments that are expected to follow after the determined segment along the transportation route to the tracking device.

Embodiment 13

The apparatus according to embodiment 11 or embodiment 12, the at least one memory and the computer program code configured to, with the at least one processor, cause the apparatus further to perform:
- determining memory capabilities of the tracking device; wherein the number of the one or more further configurations provided to the tracking device is dependent upon the memory capabilities of the tracking device.

Embodiment 14

The apparatus according to any of the embodiments 11 to 13, wherein a respective segment is associated with a geofence covering a geographic area along the transportation route.

Embodiment 15

The apparatus according to any of the embodiments 11 to 14, the at least one memory and the computer program code configured to, with the at least one processor, cause the apparatus further to perform:
- determining or adapting the configuration associated with the segment.

Embodiment 16

The apparatus according to any of the embodiments 11 to 15, wherein the configuration comprises one or more of the following segment specific settings:
- i) one or more geofences of the segment;
- ii) one or more associated radio maps of the segment;
- ii) one or more sensor rules that trigger data ingestion of the segment; and
- iii) a sample gathering interval and a tracking device report sending interval.

Embodiment 17

The apparatus according to any of the embodiments 11 to 16, wherein the configuration is provided to the tracking device over a wireless interface.

Embodiment 18

The apparatus according to any of the embodiments 11 to 17, the at least one memory and the computer program code configured to, with the at least one processor, cause the apparatus further to perform:
- determining if the tracking device is located inside a geofence based, at least in part, on the tracking device report; and
- providing the configuration associated with the geofence if the tracking device is located inside the geofence to the tracking device.

Embodiment 19

A system, comprising:
- one or more tracking devices; and
- at least one apparatus according to any of the embodiments 9 to 18, wherein a respective tracking device of the one or more tracking is configured to provide a respective tracking device report, and configured to receive a respective configuration from the at least one apparatus.

Embodiment 20

A tangible computer-readable medium storing computer program code, the computer program code when executed by a processor causing an apparatus to perform and/or control the method of any of the embodiments 1 to 8.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The subject-matter has been described above by means of example embodiments. It should be noted that there are alternative ways and variations which are obvious to a skilled person in the art and can be implemented without deviating from the scope of the appended claims.

What is claimed is:

1. An apparatus comprising at least one processor and at least one memory including computer program code, the at least one memory and the computer program code configured to, with the at least one processor, cause the apparatus to at least perform:
    sending a tracking device report at least indicative of a position of a tracking device, wherein the tracking device is configured with a plurality of positioning methods;
    receiving a configuration associated with a determined segment of the tracking device over a communication interface, wherein the determined segment is a segment along a transportation route comprising a plurality of segments to which the position of the tracking device report corresponds, wherein the configuration comprises segment specific settings for the tracking device, wherein the configuration is pushed to the tracking device based on determining that a segment change along the transportation route has occurred, or determining that an updated configuration for the determined segment not provided to the tracking device is available;
    enabling or disabling one or more positioning methods of the plurality of positioning methods of the tracking device based on the received configuration and based on entering or leaving the determined segment; and
    receiving one or more further configurations associated with one or more segments that are expected to follow after the determined segment along the transportation route over the communication interface based on determining that the segment change along the transportation route has occurred.

2. The apparatus according to claim 1, wherein a number of the one or more further configurations provided to the tracking device is dependent upon memory capabilities of the tracking device.

3. The apparatus according to claim 1, wherein the determined segment, one or more other segments of the plurality of segments, or a combination thereof is associated with a geofence covering a geographic area along the transportation route.

4. The apparatus according to claim 1, the at least one memory and the computer program code configured to, with the at least one processor, cause the apparatus further to perform:
    determining or adapting the configuration associated with the determined segment.

5. The apparatus according to claim 1, wherein the configuration comprises one or more of the following segment specific settings:
    i) one or more geofences of the determined segment;
    ii) one or more associated radio maps of the determined segment;
    ii) one or more sensor rules that trigger data ingestion of the determined segment; and
    iii) a sample gathering interval and a tracking device report sending interval.

6. The apparatus according to claim 1, wherein the configuration is provided to the tracking device over a wireless interface.

7. The apparatus according to claim 1,
    wherein the tracking device is determined as being located inside a geofence based, at least in part, on the tracking device report; and
    wherein the configuration associated with the geofence is provided to the tracking device based on the tracking device being located inside the geofence.

8. A method, comprising:
- sending a tracking device report at least indicative of a position of a tracking device, wherein the tracking device is configured with a plurality of positioning methods;
- receiving a configuration associated with a determined segment of the tracking device over a communication interface, wherein the determined segment is a segment along a transportation route comprising a plurality of segments to which the position of the tracking device report corresponds, wherein the configuration comprises segment specific settings for the tracking device, wherein the configuration is pushed to the tracking device based on determining that a segment change along the transportation route has occurred, or determining that an updated configuration for the determined segment not provided to the tracking device is available;
- enabling or disabling one or more positioning methods of the plurality of positioning methods of the tracking device based on the received configuration and based on entering or leaving the determined segment; and
- receiving one or more further configurations associated with one or more segments that are expected to follow after the determined segment along the transportation route over the communication interface based on determining that the segment change along the transportation route has occurred.

9. The method according to claim 8, the method further comprising:
- determining memory capabilities of the tracking device;
- wherein a number of the one or more further configurations provided to the tracking device is dependent upon memory capabilities of the tracking device.

10. The method according to claim 8, wherein the determined segment, one or more other segments of the plurality of segments, or a combination thereof is associated with a geofence covering a geographic area along the transportation route.

11. The method according to claim 8, the method further comprising:
- determining or adapting the configuration associated with the determined segment.

12. The method according to claim 8, wherein the configuration comprises one or more of the following segment specific settings:
- i) one or more geofences of the determined segment;
- ii) one or more associated radio maps of the determined segment;
- ii) one or more sensor rules that trigger data ingestion of the determined segment; and
- iii) a sample gathering interval and a tracking device report sending interval.

13. The method according to claim 8, wherein the configuration is provided to the tracking device over a wireless interface.

14. The method according to claim 8 wherein the tracking device is determined as being located inside a geofence based, at least in part, on the tracking device report; and
- wherein the configuration associated with the geofence is provided to the tracking device based on the tracking device being located inside the geofence.

15. A tangible computer-readable medium storing computer program code, the computer program code when executed by a processor causing an apparatus to perform and/or control:
- sending a tracking device report at least indicative of a position of a tracking device, wherein the tracking device is configured with a plurality of positioning methods;
- receiving a configuration associated with a determined segment of the tracking device over a communication interface, wherein the determined segment is a segment along a transportation route comprising a plurality of segments to which the position of the tracking device report corresponds, wherein the configuration comprises segment specific settings for the tracking device, wherein the configuration is pushed to the tracking device based on determining that a segment change along the transportation route has occurred, or determining that an updated configuration for the determined segment not provided to the tracking device is available;
- enabling or disabling one or more positioning methods of the plurality of positioning methods of the tracking device based on the received configuration and based on entering or leaving the determined segment; and
- receiving one or more further configurations associated with one or more segments that are expected to follow after the determined segment along the transportation route over the communication interface based on determining that the segment change along the transportation route has occurred.

16. The tangible computer-readable medium according to claim 15, wherein the configuration comprises one or more of the following segment specific settings:
- i) one or more geofences of the determined segment;
- ii) one or more associated radio maps of the determined segment;
- ii) one or more sensor rules that trigger data ingestion of the determined segment; and
- iii) a sample gathering interval and a tracking device report sending interval.

\* \* \* \* \*